United States Patent [19]

Eckmann

[11] Patent Number: 4,539,435

[45] Date of Patent: Sep. 3, 1985

[54] INTERACTIVE EDUCATIONAL SYSTEM WITH VOICE REACTION AND ACCESS USING TONE-GENERATING TELEPHONE

[76] Inventor: Stuart F. Eckmann, 806 Edgewood Dr., Charleston, W. Va.

[21] Appl. No.: 387,931

[22] Filed: Jun. 14, 1982

[51] Int. Cl.³ .............................................. H04M 11/00
[52] U.S. Cl. .................................. 179/2 A; 179/2 R; 434/307; 434/321
[58] Field of Search ............... 179/2 A, 2 AM, 2 DP, 179/2 CA, 2 AS, 2 R; 358/85; 340/825.26, 825.27, 825.35, 825.48; 434/321, 323, 327, 335, 350, 307; 364/200, 900

[56] References Cited

U.S. PATENT DOCUMENTS

| | | | |
|---|---|---|---|
| 3,947,972 | 4/1976 | Freeman | 434/321 |
| 4,281,994 | 8/1981 | Dell et al. | 434/321 X |
| 4,320,256 | 3/1982 | Freeman | 179/2 AS |

Primary Examiner—Gene Z. Rubinson
Assistant Examiner—W. J. Brady
Attorney, Agent, or Firm—Blodgett & Blodgett

[57] ABSTRACT

This invention relates to an automated educational system in which a remote student or subject can be interrogated by a central automated interrogation system, can respond using machine-distinguishable signals generated by a Touch-Tone-type telephone, and in which an appropriate reaction to the answer chosen by the student can be communicated to the student.

10 Claims, 1 Drawing Figure

INTERACTIVE EDUCATIONAL SYSTEM WITH VOICE REACTION AND ACCESS USING TONE-GENERATING TELEPHONE

BACKGROUND OF THE INVENTION

The concept of continuing formal education of information-based professionals is an idea which is both important and necessary. It is important because, in our rapidly changing world, a professional individual cannot maintain maximum effectiveness unless he is able to constantly review and revise his knowledge of his particular field. This is true of all disciplines, including law, medicine, engineering, and science. Both the individual and society have an interest in maximizing the effectiveness of the individual professional by maximizing the currency of his knowledge.

Formalized, and even mandatory, continuing education is necessary because even the most dedicated professional can find perfectly reasonable excuses for not seeking to update his knowledge. Given a choice between tending immediately to the needs of a patient or client, on one hand, or, on the other hand, studying information which may or may not be of immediate use, places the professional in an unfair dilemma. This dilemma is made all the more destructive if the continuing education medium is, or is perceived to be, inefficient, ineffective, inconvenient, or uninteresting.

One stalwart of the traditional continuing education system is the classroom concept, carried over from the traditional school environment. Numerous aspects of the classroom system render the approach of marginal value in a continuing education program. Inflexibility of scheduling, necessary to plan for a large number of participants and the necessity for the participants to travel to a location central enough to be available to a sufficient number of participants, render the approach of limited value.

Another primary basis of traditional continuing education involves the professional publication. Use of the professional publication in a continuing education program is necessarily limited because of the nature of the publication. First of all, the traditional professional publication is not necessarily designed as an educational tool, but rather is an instrument by which researchers publish the initial announcement of their breakthroughs. Elaborating the practical implications of the breakthroughs is generally not the primary objective of the authors, so that those practical aspects are often buried in a mass of "scientific" information. Furthermore the publication provides no feedback mechanism by which the individual professional can determine whether he understood what he read; nor does it provide a mechanism for society to know whether he understood what he read, or even if he read the material.

The modern continuing education approach has integrated a testing component into the traditional professional publication approach. Generally, a publication will include a classroom-type examination to be taken after the professional has read the materials in the publication. The examination is taken by the professional and mailed to a centralized program administrator. The administrator grades the examinations and indicates to the professional whether he received a passing grade. The practical implementation of this type of program has numerous shortcomings. First of all, the classroom-type written examination is generally not a very stimulating or interesting exercise. Furthermore, the feedback given to the professional by a grade is generally rather unenlightening in terms of indicating where his shortcomings were or any other type of information about the nature of his new knowledge. In addition, the grade generally does not come back for some period of time. Finally, if the grade is poor, it can easily discourage the student and curtail his enthusiasm. For these reasons, the examination process is not the stimulating and educational experience that it would be if the examination were conducted on a person-to-person basis in which an interrogator could respond immediately to the students answers. The concept of person-to-person dialogue, either in person or over the telephone, is most desirable, but, as a practical matter, is impossible.

These and other difficulties experienced with the prior art systems have been obviated in a novel manner by the present invention.

Therefore, the outstanding object of this invention is to provide an educational system in which a student at a remote location can interact with an automated educational center.

Another object of this invention is the provision of an educational system in which the interaction takes place over ordinary telephone lines.

A further object of the present invention is the provision of an educational system in which the student is able to respond to interrogation from the central system by using the machine-distinguishable signals generated by the standard pushbutton type telephone instrument commonly known under the trademark Touch-Tone.

It is another object of the instant invention to provide an educational system in which the student is interrogated, provided with multiple choice answers, chooses an answer, and then is immediately presented with information concerning his answer.

A still further object of the invention is the provision of an educational system in which the student can participate at a time and place totally of his or her choice.

It is a further object of the invention to provide an educational system which provides maximum educational effectiveness with minimum cost and inconvenience.

It is a still further object of the present invention to provide an educational system which easily and inexpensively generates information which can be used by vendors to isolate potential customers.

With these and other objects in view, as will be apparent to those skilled in the art, the invention resides in the combination of parts set forth in the specification and covered by the claims appended hereto.

SUMMARY OF THE INVENTION

This invention involves an automated educational testing system in which students at remote locations are able to use a standard push-button Touch-Tone-type telephone and ordinary telephone lines to interact with an automated educational and testing center. The student is provided with a publication at his location and is able to study the material in the publication at his leisure. At any time that he wishes to be tested on the material, he need merely telephone the center, to be exposed to a number of test modules. Each module will consist of a voice presentation of a question and a number of possible answers. Each answer will be related to a specific button on the telephone. The student will choose the answer he believes is correct by pressing the appropriate button on the telephone, and thereby, generating a machine-recognizable signal to the center. Automated equipment at the center will recognize the answer, choose an appropriate reaction to that answer and, deliver the appropriate voice reaction to the student. Provision is made for signaling a repeat of the question and providing various other signals to the center by means of the buttons on the telephone.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
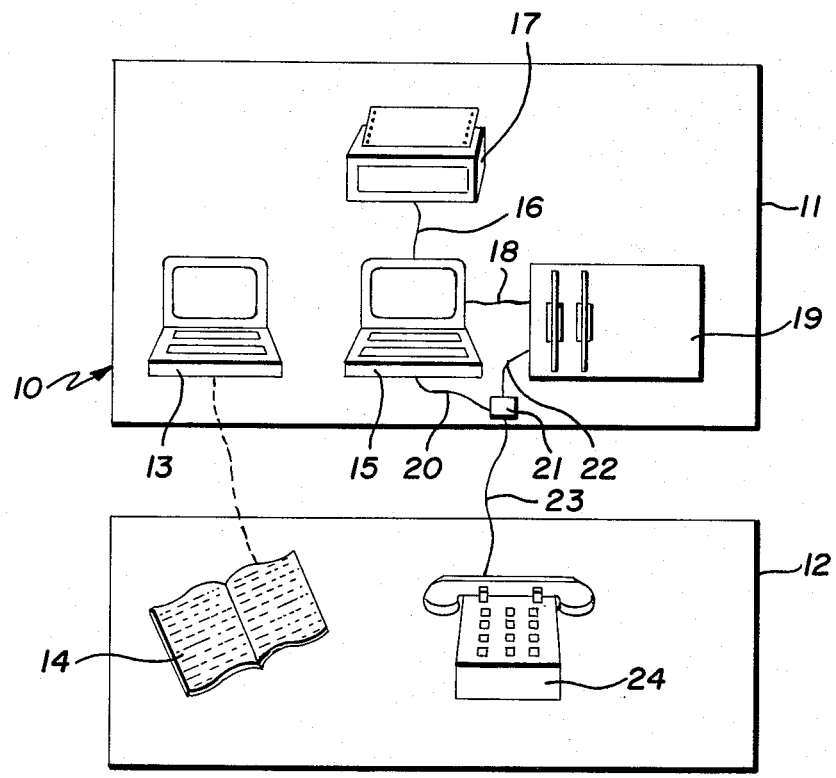
FIG. 1 is a diagrammatic representation of the organization of elements in an educational system embodying the principles of the present invention.

Referring to FIG. 1, wherein are shown the general features of the invention, the educational system, indicated generally by the reference numeral 10, is shown as having a source location 11 and a subject location 12, located remotely from the source location 11. Although the source location 11 will generally be discussed as if it were actually a single location, it will be understood by those skilled in the art that modern communication techniques will allow the operating elements of the source location to be perceived as a single location even though they may, in fact, be physically diversely located and connected by communication links. One element apparently located at the source location is the publication generating organization 13. The objective of this organization is to provide the subject location 12 with a publication 14 on a regular basis. In the preferred embodiment, the publication would be a printed publication such as a magazine. It would also be possible for the publication to take the form of a broadcast program, such as a television or radio program. It might also be possible for the publication to take the form of a computer terminal display.

Another element at the source location 11, is the controller 15. The controller 15 would normally be a programmable digital computer. The controller 15 is connected by a communication link 16 to a report generating instrument such as printer 17. The controller 15 is also connected by a communication link 18 to a storage unit 19 having "floppy" discs and a drive. In the preferred embodiment, the storage unit 19 would be capable of storing both normal digital information and also information capable of being converted into a normal human voice. The controller 15 is also connected through communication link 20 to interface unit 21.

The interface unit 21 is also connected through a communication link 22 to the storage unit 19. The interface unit 21 is also connected through communication link 23 to a telephone 24 at the subject location 12. In the preferred embodiment, the telephone is a standard push-button type telephone system commonly known under the trademark Touch-Tone. The push-button telephones which are used with the present invention are of the type which generate a series of machine-distinguishable signals of standard frequency, each signal being associated with the pressing of one button on the telephone face. In this way, a properly equipped interface unit 21 can be adapted to respond when it detects a specific one of the phone buttons being pressed while the line between the telephone 24 and the interface unit 21 is open. In situations where only dial-phones are available, a separate tone generator, which feeds into the mouthpiece or line, could be used. In the preferred embodiment, the storage unit of the present invention includes a first initiating declaration file containing data adapted to be delivered in audible form to the telephone under supervision of the controller. The data includes a response-inviting statement and a plurality of possible responses, each being associated with a different one of the machine distinguishable signals of the telephone. The storage unit also includes a plurality of reaction files. One of the reaction files represents and is associated by the controller with each of the machine distinguishable signals when that signal is generated by the telephone over the first communication link. Said one file is thereafter delivered in audible form to the telephone under supervision of the controller. The reaction file is stored either as digital signals or analog signals. In the preferred embodiment, the storage unit carries the reaction files in analog form and carries the digital information necessary for the controller to locate and use a specific reaction file.

In its simplest form, the interface unit would merely be a modem and tone discriminator operating under the control of the controller 15. In the preferred embodiment, the interface unit would be provided with its own microprocessor programmed to carry out a range of administrative functions. One such function would involve using the "call waiting" capability of the telephone system to bring additional capacity on line and to switch a waiting call to that capacity. In that way, the student would not have to wait for access, but computing capacity would be provided only when needed. The interface unit and storage device in the preferred embodiment is a LVM-80 Business Communicator sold by Votrax, a division of Federal Screw Works, 500 Stephenson Highway, Troy, Mich.

Use and operation of the invention will now be readily understood in view of the above description. It would be understood that the description of the operation is for the purpose of example and does not necessarily create limitations on the scope of the invention.

At regular, predetermined intervals, the publication-generating organization 13 generates a publication 14. The publication will contain educational material to which the student is to be exposed. For the purpose of this example, let us consider that the student is a physician. The publication might include an article on a novel approach to dealing with a certain medical problem. The publication might also include a case study of a situation to which test questions might be directed. Furthermore, the publication might include the actual questions and, associated with each question, a number of possible answers. Whenever the physician would like to be tested on his knowledge of the material in the publication, he need only to go to any telephone and communicate with the source center using standard telephone lines. When the physician reaches the source center, the controller 15 would cause the equipment at the source center to answer the telephone in a human voice. The voice would give the physician certain introductory material and then introduce the contents of a first initiating declaration file found in the storage unit 19 to the interface unit 21 for communication to the telephone 24. To assure that physician receives credit for his interactive efforts, each physician will be asked to enter a preassigned continuing education number. After that number is verified, the interactive educational sequence will begin.

The first initiating declaration file to the physician will include information necessary to pose a response-inviting statement in a human voice. This response-inviting statement will generally be a question. Also contained in the first initiating file will be a plurality of possible responses to the question and those responses will be listed to the physician in a human voice. The physician may then press the telephone button which corresponds to the question which he believes is the most correct. The interface unit 21 will react to the machine-distinguishable signal generated by touching that button and the controller will then provide to the interface unit 21 the contents of a reaction file which corresponds to the particular tone chosen by the physician. The reaction might be a simple statement that the answer is either correct or incorrect. It might also include elaborations and other sorts of information which might be useful in maximizing the educational component of the interrogation. In the preferred embodiment, one of the telephone buttons would communicate to the source location 11 that the physician would like to have the possible answers repeated. Another button would communicate that the physician would like to move on to the next question. The controller would keep track of the correctness of the students answers. The next question would be stored in a second initiating declaration file and the process would be continued throughout the number of questions.

In the normal procedure, the student would be required to code in his identification number using the telephone buttons. In this way, the controller 15 would be able to provide a record of the results of the examination to the accrediting organizations. This would normally be done through reports printed out by the report-generating equipment 17. An additional important aspect of this is that the student could be asked whether he would like more information about the examination materials or whether he would like information about products or services which relate to the educational materials and which vendors would like to sell to the students. This information could be communicated to the vendors to provide them with valuable commercial leads.

Because the system is automated, it can be available to the student at any time and from any phone location which the student chooses. Furthermore, the automated equipment can be programmed in such a way that additional on line capacity can be automatically brought into force to deal with large numbers of students wishing to use the system at a given time. Thus, the system is able to utilize all of the efficiency generating characteristics of modern automation and yet, because the system uses human voices to interact with the student, the system retains a very human character.

The following is an actual example of some of the textual material which might be used in a typical educational module.

This example is directed to physicians. The physician would receive a monthly publication. For each simulated patient management problem, the publication would include a brief patient history and a list of choices for each question. The list would be brief—simply a reference so the physician does not have to request that the questions be repeated. The text might read as follows:

PATIENT HISTORY

A 50-year-old white male presents with three weeks of episodic fatigue and exertional dypsnea. Symptoms have occurred at least once daily, and episodes have lasted from a few minutes to about one hour. With the longer attacks, he notes a decreased ability to concentrate on his work. There have been no other associated symptoms.

The past history is notable only for peptic ulcer disease at age 21, with no recurrence, but with occasional acid indigestion. He smokes one pack per day, and has about four ounces of alcohol daily. His family history is unremarkable.

CHOICES 1. nitroglycerin
2. re-examine
3. echocardiogram
4. Holter monitor
5. stress test
6. thyroid test
7. upper GI series
1. cardiovert
2. CCU
3. lung scan
4. quinidine
5. digoxin loading
6. digoxin maintenance
7. beta blocker The publication would provide the physician with the following instructions.

When you choose what you feel to be the best course of action, indicate your choice by pressing the corresponding button on your telephone. As soon as you enter your choice, you will find out the outcome of that treatment. To make a second choice, simply press the corresponding button on your telephone. You can continue to make additional choices until you are satisfied with the outcome of your decisions. If you would like to have the questions repeated, press the bottom left button, the asterisk (*). When you are satisfied with the patient's response to your choice, and are ready to go on, push the bottom right button, the pound sign (#).

By picking up any push-button Touch-Tone telephone, a physician could hook up with an interactive, voice-responsive, patient management problem that is truly a learning experience. When the physician reached the source center, he would hear the following in a human voice generated from the first initiating declaration file in the storage unit 19.

Thank you for calling the interactive CME telephone line. You have chosen CARDIOLOGY MODULE I and have has an opportunity to review the patient's history.

On physical examination, this 50-year-old white male appears healthy, and is in no physical distress. Blood pressure is 140 over 90, bilaterally. Pulse is 80 and occasionally irregular. The remainder of the examination, including cardiac examination, in supine and left lateral decubitus positions, is normal. Routine blood studies, resting electrocardiogram, and chest X-ray are normal.

What would be your next step in the diagnosis and treatment of this patient? In a moment, you will be given several different options. When you choose what you feel is the best course of action, indicate your choice by pressing the corresponding button on your telephone.

Choice one: you can prescribe nitroglycerin on a presumptive diagnosis of angina pectoris. Choice two: you can re-examine your patient in both standing and squatting positions. Choice three: you can order an echocardiogram. Choice four: you can order a Holter monitor. The fifth choice is a stress test. The sixth choice is a thyroid function test. And the seventh choice is to pursue the history of indigestion with an upper GI series. Please make a choice.

Depending on which button the physician presses, the gets the following reactions in a human voice, generated from one of the reaction files in the storage unit 19.

Button 1. The patient does not tolerate this treatment. He has no relief of his symptoms, and he feels—in fact—very badly.

Button 2. The patient's examination is negative. You can rule out mitral valve prolapse, but still need to consider other alternatives.

Button 3. The echocardiogram is normal. You can rule out mitral valve prolapse in your consideration of other alternatives.

Button 4. During the 24 hours the patient wears the Holter monitor, it shows that he has recurrent runs of atrial fibrillation, which—in fact—correlate with his symptoms.

Button 5. There is a point five millimeter ST depression in lead V5 when the patient reaches 85% of his predicted heart rate, and he has no symptoms at that time.

Button 6. Thyroid function is normal.

Button 7. The upper GI series is normal.

When the physician is satisfied, he presses the bound sign and hears the following in a human voice.

You have evaluated the results of whatever test or tests you ordered. Your next step is to see the patient again. When he comes to your office, he is now in atrial fibrillation. He has a ventricular rate of 140. You now have several choices.

One: you can decide to electrically cardiovert him. Two: you can admit him to the coronary care unit. Choice three: you can order a lung scan, on the presumption that he has recurrent pulmonary emboli. The fourth possibility: because your patient is in atrial fibrillation, you can give him quinidine, 200 milligrams, four times a day. Choice five: digitalize your patient, giving him a loading dose of digoxin in the first 24 hours. Choice six: start maintenance digoxin, giving point two five milligrams for the first three days, then reducing the dose in half to point one two five milligrams daily. Choice seven: give your patient a beta-blocking drug. Please make a choice.

As before, the physician would respond by pressing a telephone button and would hear a reaction in a human voice.

Button 1. By the time you arrange with the hospital to do the procedure, he's back in regular rhythm. But you still need to diagnose his problem. Make another choice.

Button 2. You admit him to the coronary care unit. He converts to regular rhythm spontaneously, and has no further symptoms or arrhythmias for 48 hours. His enzymes and EKG are all normal. You still need to make another choice.

Button 3. The lung scan shows questionable subsegmental areas of diminished perfusion at the left lung base. At this point, you can reconsider one of the other choices, or you can order a pulmonary angiogram. If you choose to order the angiogram, do so by pushing button number eight.

Button 4. The patient returns two days later. He's still in fibrillation, feeling worse, and his heart rate has now jumped to 180. Make another choice.

Button 5. The next day the patient feels very nauseated. He has skips in his heart beat, and his electrocardiogram shows ventricular premature contractions. Consider another choice.

Button 6. Your patient has no further symptoms until ten days later. Then he has his usual attack, but the symptoms are much milder. His cardiogram reveals fibrillation, but a heart rate of only 90. That's a good response! Please push the pound button.

Button 7. Your patient complains that his medicine makes him feel extremely tired all the time, and tells you he can't take it. At this point, you can reconsider one of the other treatment regimens, or you can try another beta blocker. If you want to try another beta blocker, do so by pushing button number nine.

Button 8. As a result of the pulmonary angiogram, you produce rapid atrial fibrillation by passing the catheter, and your patient requires direct current shock to get him back into regular rhythm. You also produce a thrombosis of the femoral vein, and the end result is that you also don't find any emboli. If you chose to perform a pulmonary angiogram on the basis of the lung scan, keep in mind that the results of the scan, while somewhat equivocal, were basically normal for a patient of this age. The angiogram was clearly not a good choice. Go back and make another choice.

Button 9. Your patient's arrhythmia is now under control, and your patient tells you that his fatique is "tolerable". If you want to consider another choice, push the appropriate button. If you are satisfied with this choice, push the pound sign.

Pound sign button. A beta blocker is an acceptable method of treatment. However, this patient responded best to a maintenance dose of digoxin, with a reduction three days later to half the initial dose. If you chose this regimen, you might also consider adding a long-acting quinidine preparation. The quinidine with the digoxin would probably eliminate any further attacks.

The diagnosis is paroxysmal atrial fibrillation in the absence of any underlying heart disease. The diagnosis was confirmed by the Holter monitor, which showed bursts of atrial fibrillation, which correlated with the patient's symptoms. Further confirmation would be elimination of any symptoms on a regimen of digoxin and quinidine. If the patient ever becomes intolerant of the digoxin-quinidine regimen, the beta blocker is an acceptable fallback position.

When the series of questions, answers and reactions is complete, the physician would hear the following in a human voice.

That concludes this week's patient problem. CARDIOLOGY MODULE I was brought to you by _____, makers of _____. If you would like to receive more information about this clinical situation, please push button number one. If you would like to have a _____ representative tell you more about _____, please push button number two.

Be sure to call again next week, for a new CARDIOLOGY MODULE patient problem. You can hear a new program beginning every Saturday. Remember, for 00 Category I CME credits, you can reach the CREDIT LINE 24 hours a day, from your office, your home, wherever you can pick up a Touch-Tone phone.

This last paragraph demonstrates the market research capability of this system. By combining automation with the human-voice question-answer-reaction sequence, a highly efficient method of eliciting information over the telephone is developed.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A remote interactive communication system comprised of:
   (a) a source location,
   (b) a subject location remote from the source location,
   (c) a telephone located at the subject location and adapted to generate a plurality of machine distinguishable signals,
   (d) an interface unit located in the source location,
   (e) a first communication link betwen the telephone and the interface unit,
   (f) a programmable controller located at the source location,
   (g) a second communication link between the interface unit and the controller,
   (h) a storage unit which includes a plurality of magnetically encodable discs,
   (i) a third communication link between the interface unit and the storage unit,
   (j) a fourth communication link between the controller and the storage unit,
   (k) a first initiating declaration file stored in the storage unit containing data adapted to be delivered in audible form to the telephone under supervision of the controller, the data including a response-inviting statement and a plurality of possible responses, each being associated with a different one of the machine distinguishable signals of the telephone, and
   (l) a plurality of reaction files stored in the storage unit, one of which files represents and is associated by the controller with each of the machine distinguishable signals when that signal is generated by the telephone over the first communication link, said one file being thereafter delivered in audible form to the telephone under supervision of the controller.

2. A system as recited in claim 1, wherein the telephone is of the push-button type and the machine distinguishable signals are the standard tones.

3. A system as recited in claim 1, wherein the first communication link is a standard telephone line.

4. A system as recited in claim 1, wherein the programmable controller is a digital computer.

5. A system as recited in claim 1, wherein the reaction files are stored as digital signals.

6. A system as recited in claim 1, wherein the reaction files are stored as analog signals.

7. A system as recited in claim 1, wherein a tone decoder is provided to cause delivery to the telephone of the appropriate reaction file in response to a given machine distinguishable signal from the telephone.

8. A system as recited in claim 1, wherein the storage unit carries the reaction files in analog form and carries digital information necessary for the controller to locate and use a specific reaction file.

9. A system as recited in claim 1, wherein a publication is provided at the subject location, said publication containing text background information relating to the first initiating declaration.

10. A system as recited in claim 9, wherein the publication is a printed publication.

* * * * *